United States Patent Office.

WASHINGTON STICKNEY AND NATHAN B. CHASE, OF LOCKPORT, NEW YORK.

Letters Patent No. 73,553, dated January 21, 1868.

IMPROVED COMPOSITION FOR FUEL.

*The Schedule referred to in these Letters Patent and making part of the same.*

TO ALL WHOM IT MAY CONCERN:

Be it known that we, WASHINGTON STICKNEY and NATHAN B. CHASE, of Lockport, State of New York, have invented a new and useful Composition for Fuel; and we hereby declare the following to be a full and exact description of the same.

The nature of our invention consists in the combination of coal, pitch, coal-tar, benzine, tan-bark, saw-dust, peat, and other fine woody or vegetable substances, which we truly believe have not been known or used prior to the invention thereof by your petitioners.

The coal consists of screenings and other fine portions, which accumulate in great abundance in coal-yards, and hitherto have been considered comparatively valueless. The tan-bark used (commonly called spent tan-bark) is also comparatively useless and very abundant. These, with other ingredients, hitherto considered of little or no value, are so combined as to form a cheap and convenient fuel, and may be compressed, by mechanical power, into blocks convenient for use. The coal-tar cements the whole, making a solid mass, which may be readily ignited, and is well adapted for common fuel, especially for summer use.

The above ingredients are combined in the following proportions, to wit: Coal, three (3) parts; tan-bark, two (2) parts; saw-dust, two (2) parts; peat, or other fine woody or vegetable matter, one (1) part; coal-tar or pitch, one (1) part, or sufficient to cement the whole; or they may be combined in a greater or less proportion of either, securing substantially the same result. The whole mass may be easily ignited with shavings or paper, or more readily by the application of a small quantity of benzine and a match.

Having thus described our invention, what we claim, and desire to secure by Letters Patent of the United States, is—

The improved composition for fuel, prepared of the materials, and substantially in the manner, herein set forth.

WASHINGTON STICKNEY,
NATHAN B. CHASE.

Witnesses:
GEO. W. BOUGHTON,
HENRY BOUGHTON.